United States Patent
Kim

(10) Patent No.: US 6,300,152 B1
(45) Date of Patent: Oct. 9, 2001

(54) METHOD FOR MANUFACTURING A PANEL FOR A LIQUID CRYSTAL DISPLAY WITH A PLASMA-TREATED ORGANIC INSULATING LAYER

(75) Inventor: Sang-Gab Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/472,246

(22) Filed: Dec. 27, 1999

(30) Foreign Application Priority Data

Jun. 30, 1999 (KR) .................................. 99-26023

(51) Int. Cl.[7] .................................. H01L 21/00
(52) U.S. Cl. .................. 438/30; 438/149; 438/151; 438/609; 349/138
(58) Field of Search ............... 438/30, 149, 151, 438/158, 608, 609; 257/59; 349/138

(56) References Cited

U.S. PATENT DOCUMENTS

| | | | |
|---|---|---|---|
| 5,157,527 | * | 10/1992 | De Keyser et al. . |
| 5,583,676 | * | 12/1996 | Akiyama et al. . |
| 5,650,867 | * | 7/1997 | Kojima et al. . |
| 5,883,682 | * | 3/1999 | Kim et al. . |
| 5,917,571 | * | 6/1999 | Shimada . |
| 5,950,077 | * | 9/1999 | Ohue et al. . |
| 6,188,452 | * | 2/2001 | Kim et al. . |

FOREIGN PATENT DOCUMENTS 63-168624-A * 7/1988 (JP) .
11-337973-A * 12/1999 (JP) .

* cited by examiner

Primary Examiner—Charles Bowers
Assistant Examiner—Stephen W. Smoot
(74) Attorney, Agent, or Firm—Howrey Simon Arnold & White, LLP

(57) ABSTRACT

Disclosed is an organic insulating layer that is formed on an insulating substrate for an LCD having a gate electrode, a semiconductor layer, and a source and drain electrode, and that is patterned to form a contact hole exposing the drain electrode. The organic insulating layer is treated with argon plasma to remove residues of the organic insulating layer and to increase its surface roughness. Next, a transparent insulating layer, such as an ITO layer, is deposited and patterned to form a pixel electrode connected to the drain electrode through the contact hole. By this method, contact resistance between the pixel electrode and the drain electrode is reduced. The transparent electrode pattern is prevented from being over-etched and undercut during wet etch patterning because the adhesion between the organic insulating layer and the transparent conducting layer is strengthened. As a result, the width uniformity of the transparent electrode pattern is increased.

29 Claims, 16 Drawing Sheets

METHOD FOR MANUFACTURING A PANEL FOR A LIQUID CRYSTAL DISPLAY WITH A PLASMA-TREATED ORGANIC INSULATING LAYER

BACKGROUND OF THE INVENTION (a) Field of the Invention

The present invention relates to a method for manufacturing a liquid crystal display (LCD) panel.

(b) Description of the Related Art

An LCD is one of the most popular flat panel displays (FPDs). The LCD has two panels having two kinds of electrodes and wires for generating electric fields and a liquid crystal layer interposed therebetween. The intensity of the electric field applied to the liquid crystal layer controls the transmittance of incident light.

The wires and electrodes are formed by depositing and patterning conductive thin films. Insulating layers or passivation layers of silicon oxide ($SiO_2$) or silicon nitride (SiNx) are formed between the wires or between the wires and electrodes to insulate them. An organic insulating layer consisting of materials such as benzocyclobutene (BCB), perfloucyclobutene (PFCB), and acrylic resin has recently been used as a passivation layer to increase the aperture ratio of the LCD and flatness of the layer. As these organic insulating layers have photosensitivity, neither an etching process nor another photoresist layer is needed to pattern these organic insulating layers. Therefore, the overall manufacturing process can be simplified.

However, an organic insulating layer is softer than the conventional insulating layer such as a SiNx layer. Therefore, when forming a contact hole, residues of the organic insulating layer tend to remain. The residues disturb the contact between the two conducting layers through the contact hole and cause a high contact resistance.

Additionally, an organic insulating layer does not as strongly adhere to a transparent conducting layer formed by indium tin oxide (ITO) sputtering. Therefore, the ITO layer may be easily undercut or over-etched when forming a pixel electrode. As a result, the critical dimensions of the eletrodes become irregular.

SUMMARY OF THE INVENTION

It is therefore an object of the present invention to reduce a contact resistance between the metal layer and the transparent electrode by removing residues in the contact hole.

It is the other object of the present invention to prevent undercutting and over-etching of the transparent conducting layer by strengthening the adhesion between the organic insulating layer and the transparent conducting layer.

These and other objects are provided, according to the present invention, by treating the organic insulating layer with argon plasma or with oxygen plus argon plasma.

According to the present invention, an organic insulating layer is formed on an insulating substrate and is treated with a plasma. By this plasma treatment, surface roughness of the organic insulating layer is increased. Next, a transparent conducting layer is deposited on the organic insulating layer and patterned. At this time, argon gas may be used as a plasma gas.

The organic insulating layer may also be treated with oxygen plasma before the plasma treatment for increasing roughness.

A gate wire including gate lines and gate electrodes is formed on an insulating substrate. A semiconductor layer of amorphous silicon is formed to overlap and to be insulated from the gate electrode. A data wire including data lines, source electrodes, and drain electrodes is formed. At this time, the data lines cross and are insulated from the gate lines. The source electrodes are connected to the data lines and overlap a part of the semiconductor layer. The drain electrodes overlaps a part of the semiconductor layer opposite to the source electrodes. An organic insulating layer is coated and patterned to form contact holes exposing the drain electrodes. A transparent conducting layer is deposited and patterned to form pixel electrodes connected to the drain electrode through the contact holes. At this time, a pixel electrode is formed in a pixel area defined by the crossing of the gate lines and the data lines. The boundary of the pixel electrodes preferably overlaps the gate lines and the data lines.

The surface of the drain electrode exposed through a contact hole may be treated by argon sputtering. This treatment is particularly effective when the drain electrode is made of chromium (Cr) so that a chromium oxide layer having high resistance is apt to be formed on the surface.

Data pads connected to ends of the data lines may be formed. A data pad is exposed through a contact hole of the organic insulating layer. The data pads are preferably treated by argon sputtering along with the drain electrodes. A redundant data pad of the transparent conducting layer may be formed to contact with a data pad.

The semiconductor layer may be formed of polysilicon. At this time, the semiconductor layer preferably includes a source and drain region doped with impurities and a channel region that is not doped.

A color filter pattern and a black matrix pattern are formed on the insulating substrate. A transparent conducting layer is formed on the color filter and the black matrix pattern. At this time, the transparent conducting layer may be etched to form an aperture pattern.

Color filters may be formed on a thin film transistor array panel. At this time, the color filters are patterned to form contact holes exposing the drain electrodes. The color filters and the contact holes are treated by plasma to remove residue and to increase surface roughness. Then, a transparent conducting layer is deposited on the color filters.

When an organic passivation layer is coated on the color filters, the organic passivation layer is patterned along with the color filters to expose the drain electrodes. The contact hole and the organic passivation layer are treated by plasma to remove residue of the color filters and the organic passivation layer and to increase surface roughness of the organic passivation layer. Then, a transparent conducting layer is deposited on the organic passivation layer.

At this time, the plasma treatment may include an argon plasma treatment only, or an oxygen plasma treatment as a first process and an argon plasma treatment as a second process.

A thin passivation layer may also be formed between the color filters and the semiconductor layer.

DETAILED DESCRIPTION OF THE PREFERRED EMBODIMENTS

Figure 1:
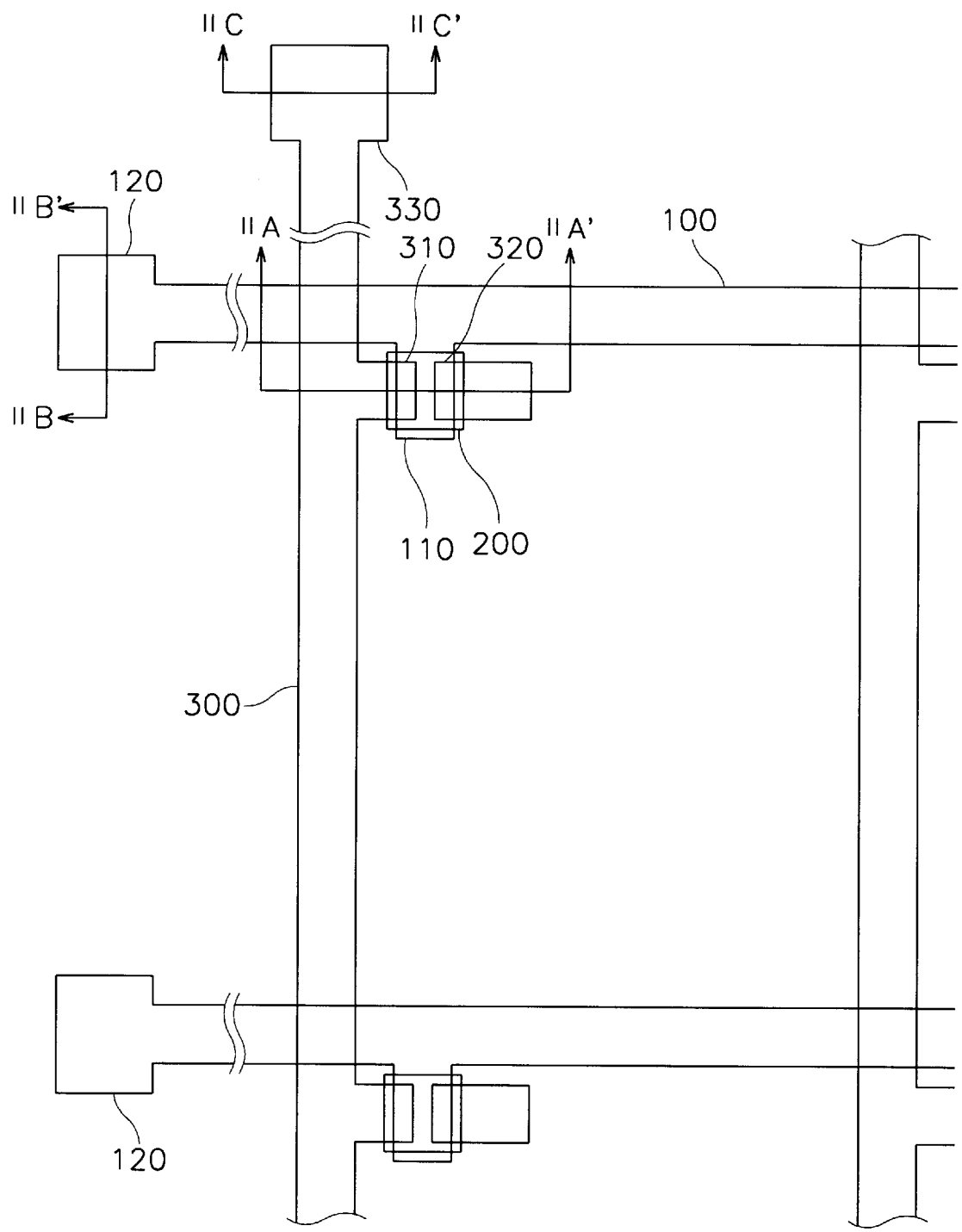
FIGS. 1, 3, and 6 are layout views of a substrate in steps of manufacturing an amorphous silicon thin film transistor array panel according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

FIGS. 1 to 8 are layout views and cross-sectional views of a substrate in the steps of manufacturing an amorphous silicon thin film transistor array panel according to a first embodiment of the present invention.

Figure 2:
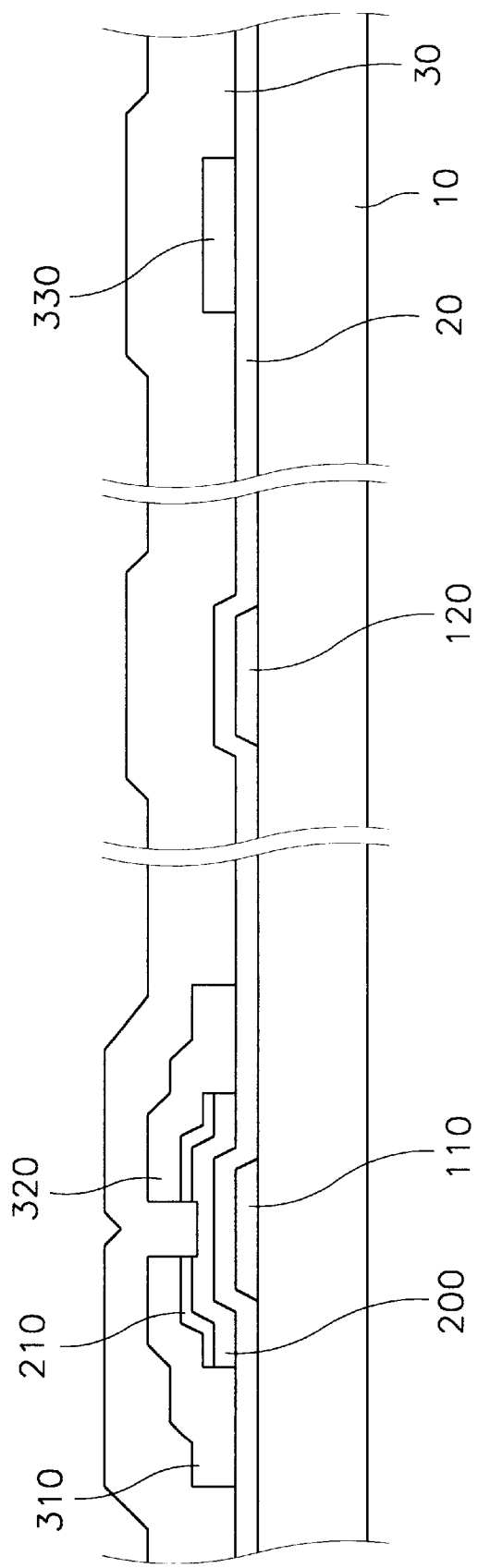
FIG. 2 is the cross-sectional view taken along section lines IIA–IIA', IIB–IIB–, and IIC–IIC'.

As shown in FIGS. 1 and 2, a metal layer is deposited on an insulating substrate 10 and patterned to form a gate wire. The gate wire includes a plurality of gate lines 100 extending in a horizontal direction on FIG. 1, a plurality of gate electrodes 110 connected to the gate line 100, and a plurality of gate pads 120 connected to an end of the gate line 100 and receiving scanning signals.

Next, a gate insulating layer 20, an amorphous silicon layer, and a doped amorphous silicon layer are sequentially deposited on the gate wire 100, 110, and 120. The doped amorphous silicon layer and the amorphous silicon layer are patterned at the same time to form a semiconductor layer 200 and an ohmic contact layer 210 of the gate electrode 110.

Another metal layer of chromium (Cr), molybdenum (Mo), and molybdenum alloy (Mo-alloy) is deposited on the semiconductor layer 200, the ohmic contact layer 210, and the gate insulating layer 20 and then patterned to form a data wire. The data wire includes a plurality of data lines 300 extending in a vertical direction on FIG. 1, a plurality of source electrodes 310 connected to the data line 300 and overlapping a side portion of the semiconductor layer 200, a plurality of drain electrodes 320 overlapping another side portion of the semiconductor layer 200 at the opposite side of the source electrode 310, and a plurality of data pads 330 connected to an end of the data line 300.

Next, the portion of the ohmic contact layer 210 not covered by the source electrode 310 and the drain electrode 320 is removed. A photosensitive organic insulating layer 30 is then coated thereon.

Figure 3:
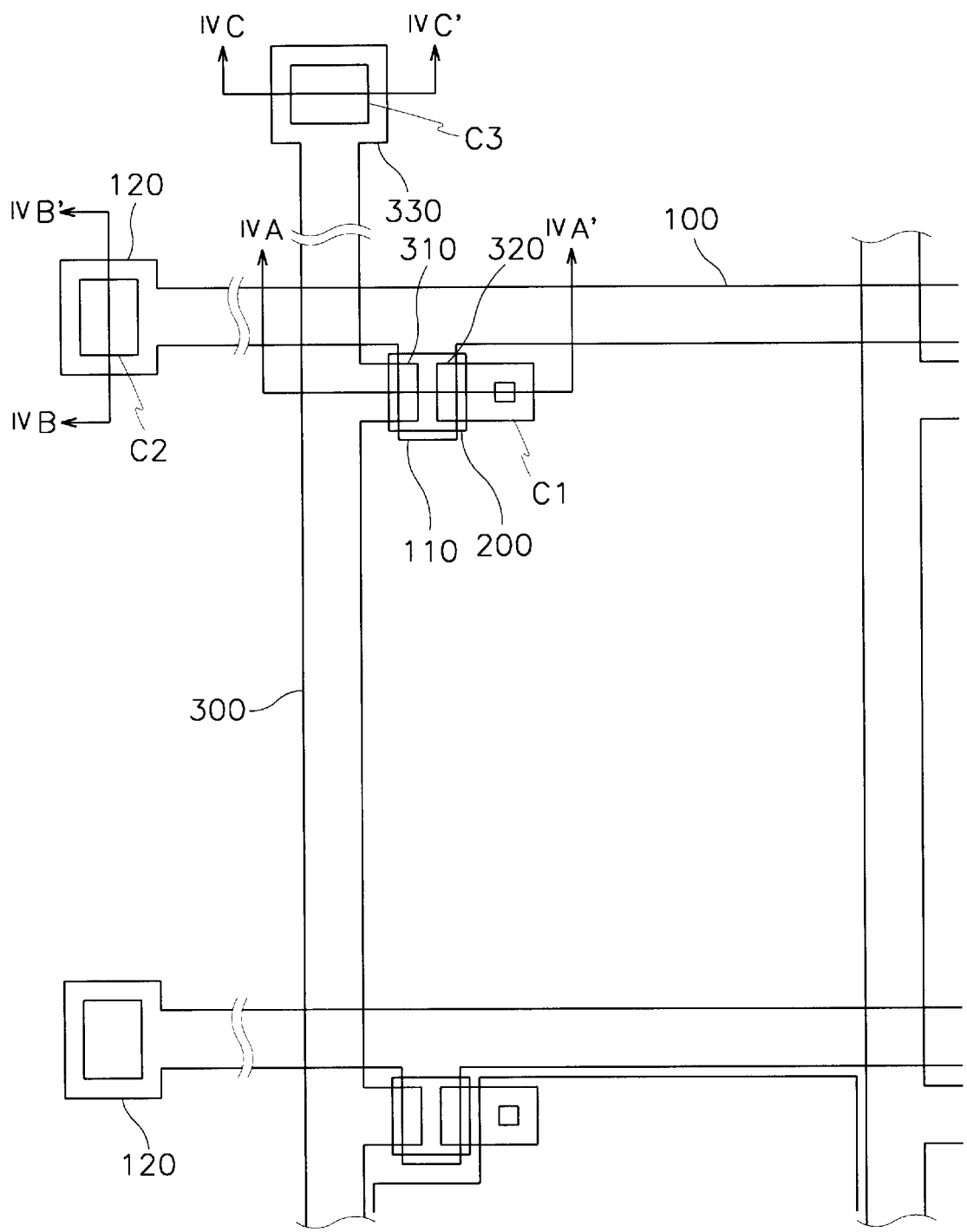
Figure 4:
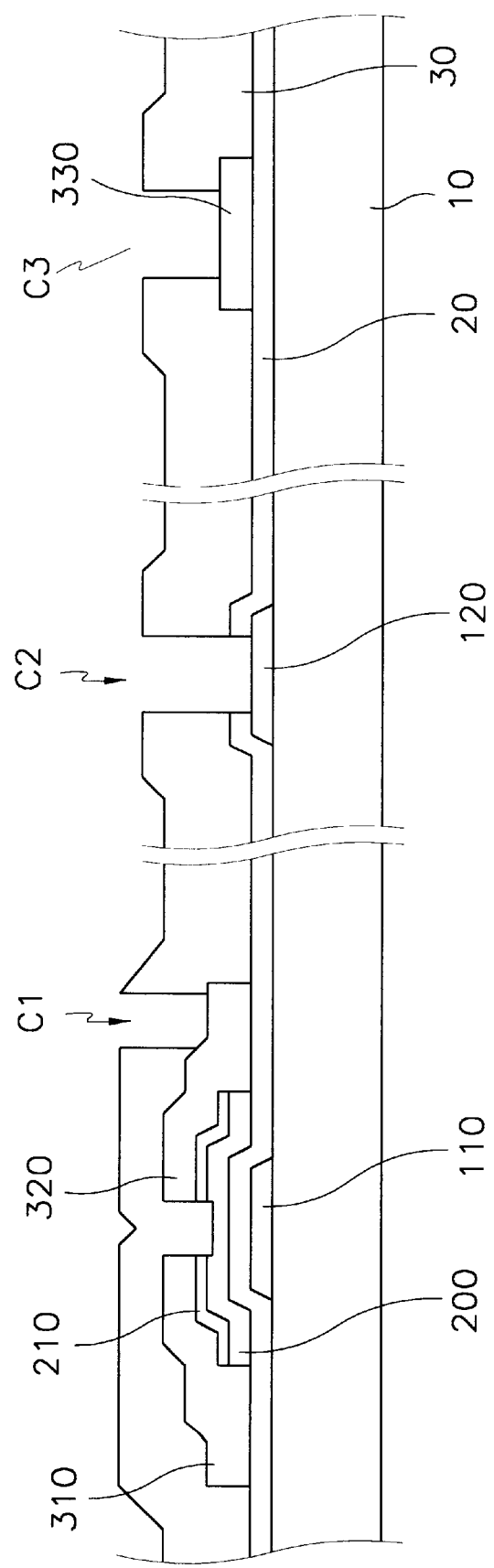
FIGS. 4 and 5 are the cross-sectional views taken along section lines IVA–IVA', IVB–IVB', and IVC–IVC'.

As shown in FIGS. 3 and 4, the organic insulating layer 30 is illuminated and developed to form contact holes C1, C2, and C3 respectively exposing the drain electrode 320, the gate insulating layer 20 on the gate pad 120 and the data pad 330. The exposed portion of the gate insulating layer 20 is etched to expose the gate pad 120 through the contact hole C2. At this time, some residues of the organic insulating layer 30 may remain in the contact holes C1, C2, and C3.

Figure 5:
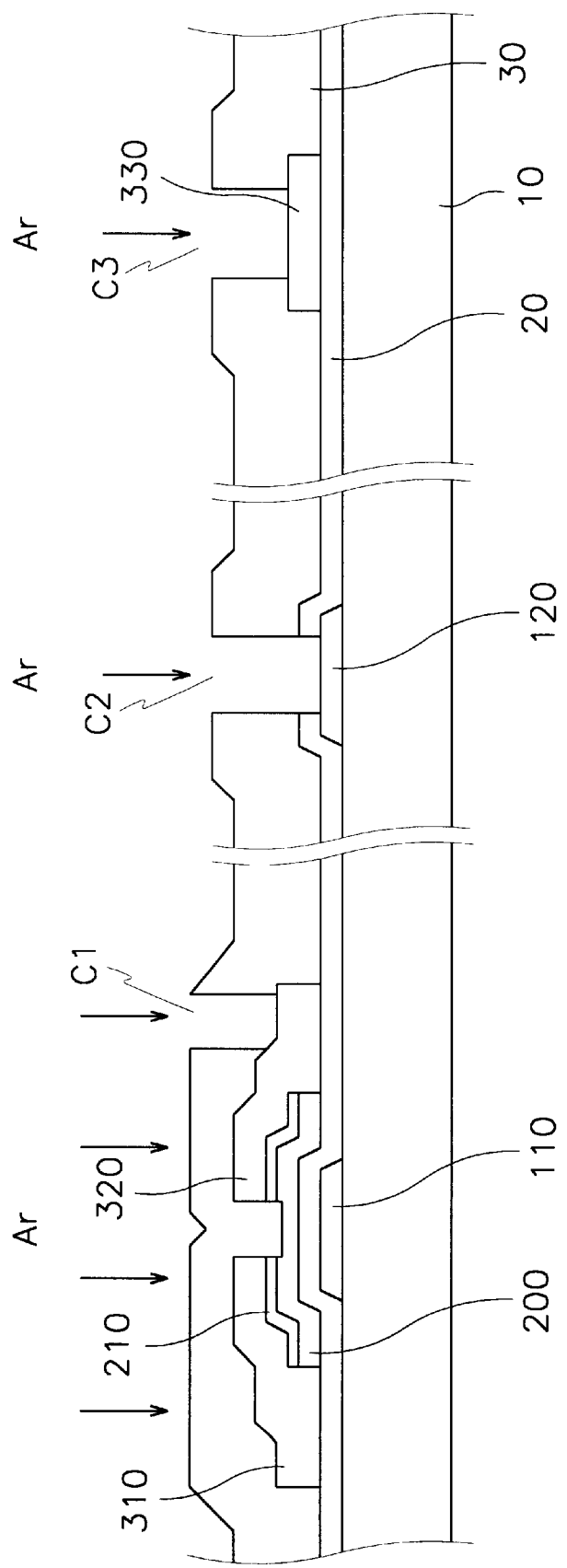

As shown in FIG. 5, the panel is plasma treated for about 60 seconds using argon (Ar) as reacting gas. This plasma treatment removes the residues in the contact holes C1, C2, and C3. At the same time, it increases the roughness of the organic insulating layer 30.

Figure 6:
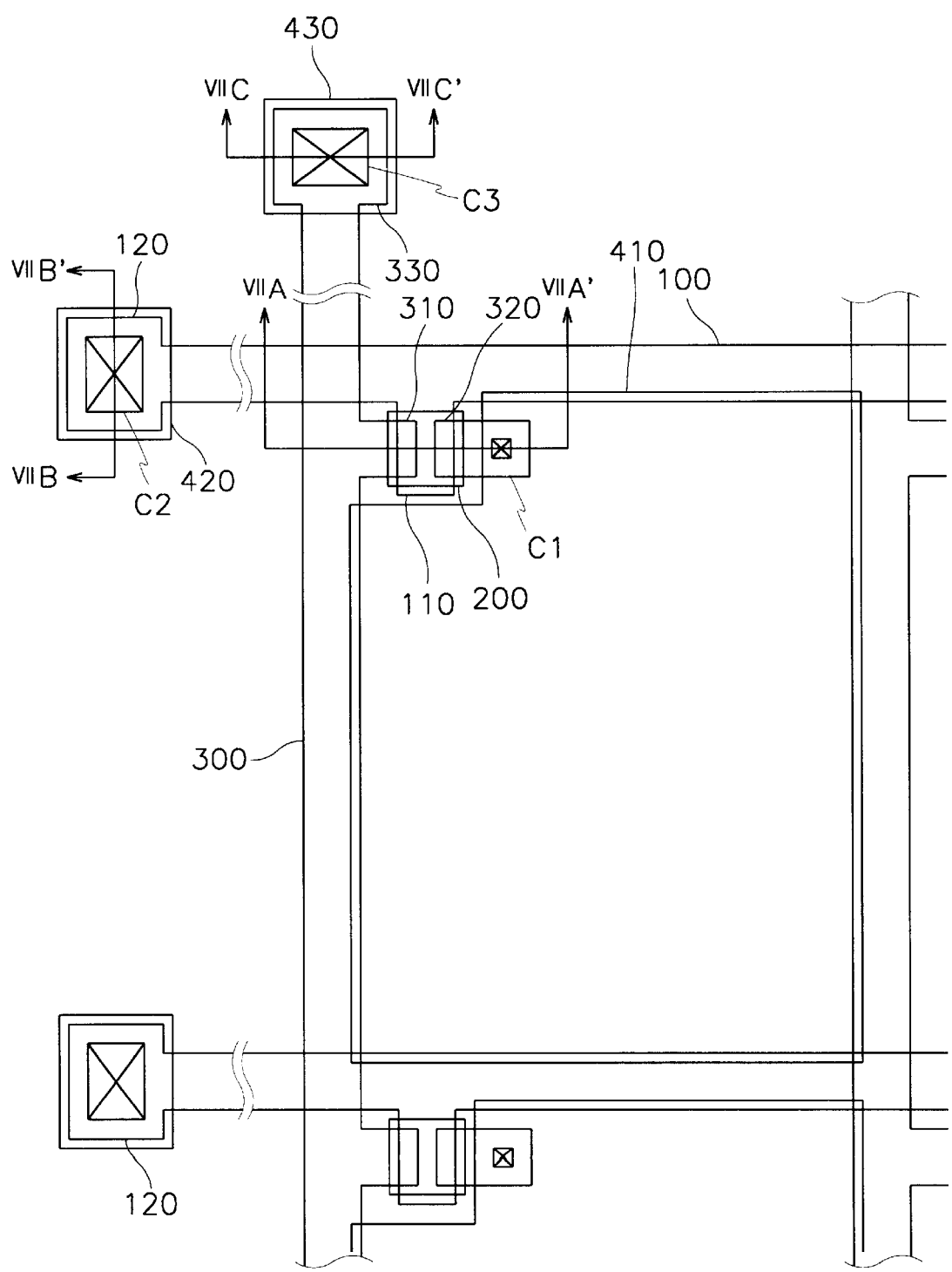
Figure 7:
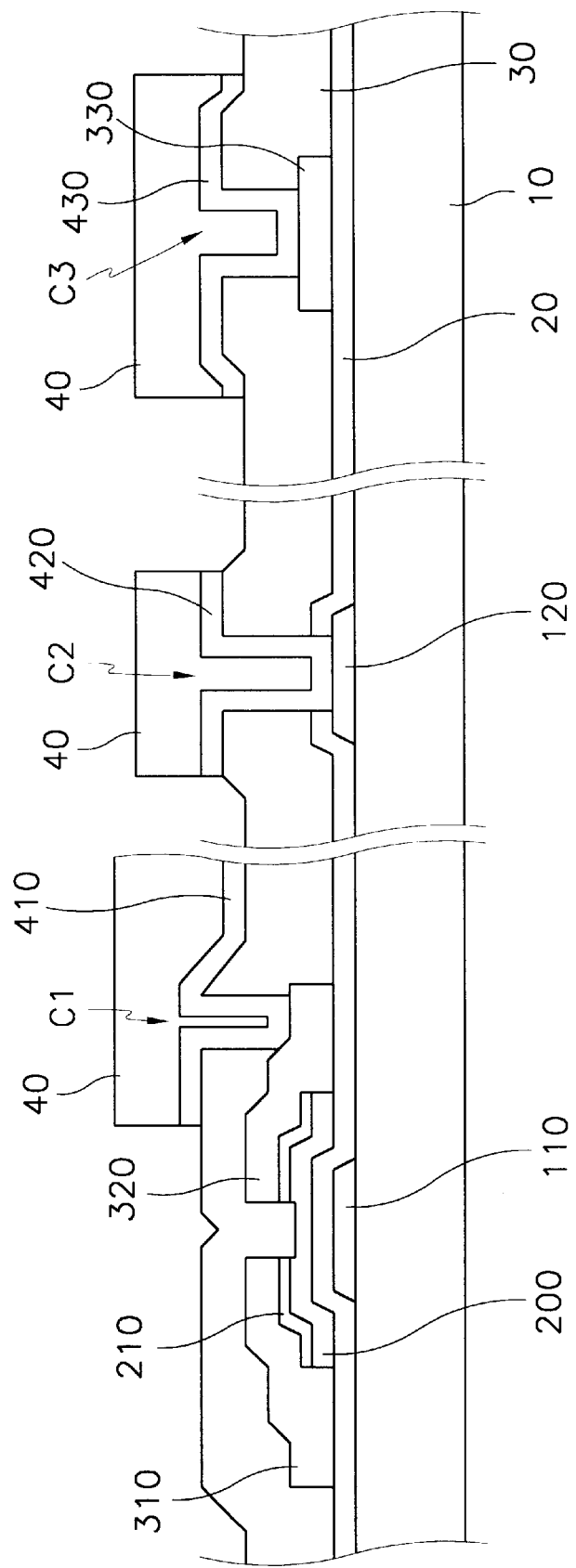
FIGS. 7 and 8 are the cross-sectional views taken along section lines VIIA–VIIA', VIIB–VIIB', and VIIC–VIIC'.

As shown in FIGS. 6 and 7, a transparent conducting layer such as indium-tin-oxide (ITO) is deposited on the organic insulating layer 30. A photoresist layer pattern 40 is formed on the transparent conducting layer. The transparent conducting layer is etched by using the photoresist layer pattern 40 as mask to form a pixel electrode 410, a redundant gate pad 420, and a redundant data pad 430. At this time, the pixel electrode 410, the redundant gate pad 420, and the redundant data pad 430 are respectively connected to the drain electrode 320, the gate pad 120, and the data pad 330 through the contact holes C1, C2, and C3. The pixel electrode 410 is located in a pixel area surrounded by the gate lines 100 and the data lines 300. Boundaries of the pixel electrode 410 overlap the gate lines 100 and the data lines 300.

Figure 8:
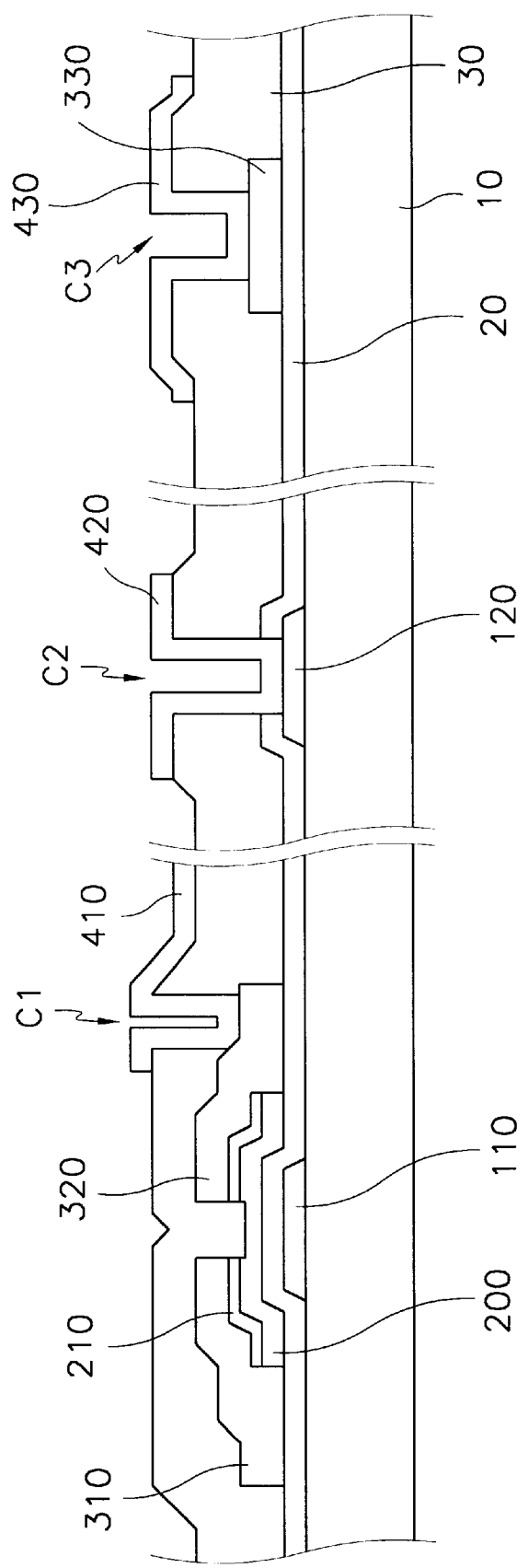

Next, as shown in FIG. 8, the photoresist layer pattern 40 is removed.

As described above, the method of manufacturing an amorphous silicon thin film transistor array panel according to the first embodiment of the present invention that treats the organic insulating layer 30 by argon plasma, reduces the contact resistance between the pixel electrode 410 and the drain electrode 320 because the residues in the contact holes C1, C2, and C3 are removed. The method also improves the adhesion between the ITO layer and the organic insulating layer because of the increased roughness of the organic insulating layer 30. Therefore, the ITO patterns 410, 420, and 430 are prevented from over-etching and undercutting during the wet-etch patterning. As a result, the ITO patterns 410, 420, and 430 may keep uniformity in width.

Now, a second embodiment of the present invention treating the organic insulating layer 30 by oxygen plasma and argon plasma will be described.

Figure 9:
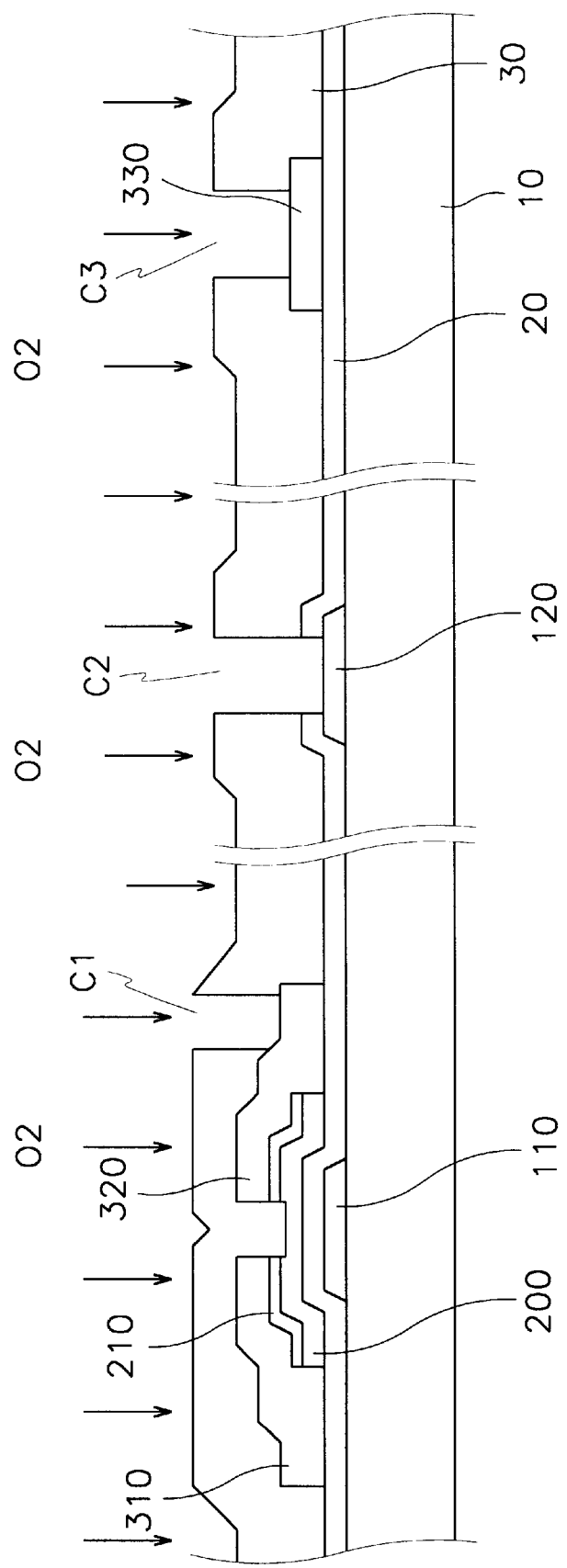
FIGS. 9 and 10 are a cross-sectional views showing a process of treating an organic insulating layer in the manufacturing process of an amorphous silicon thin film transistor array panel according to a second embodiment.
Figure 10:
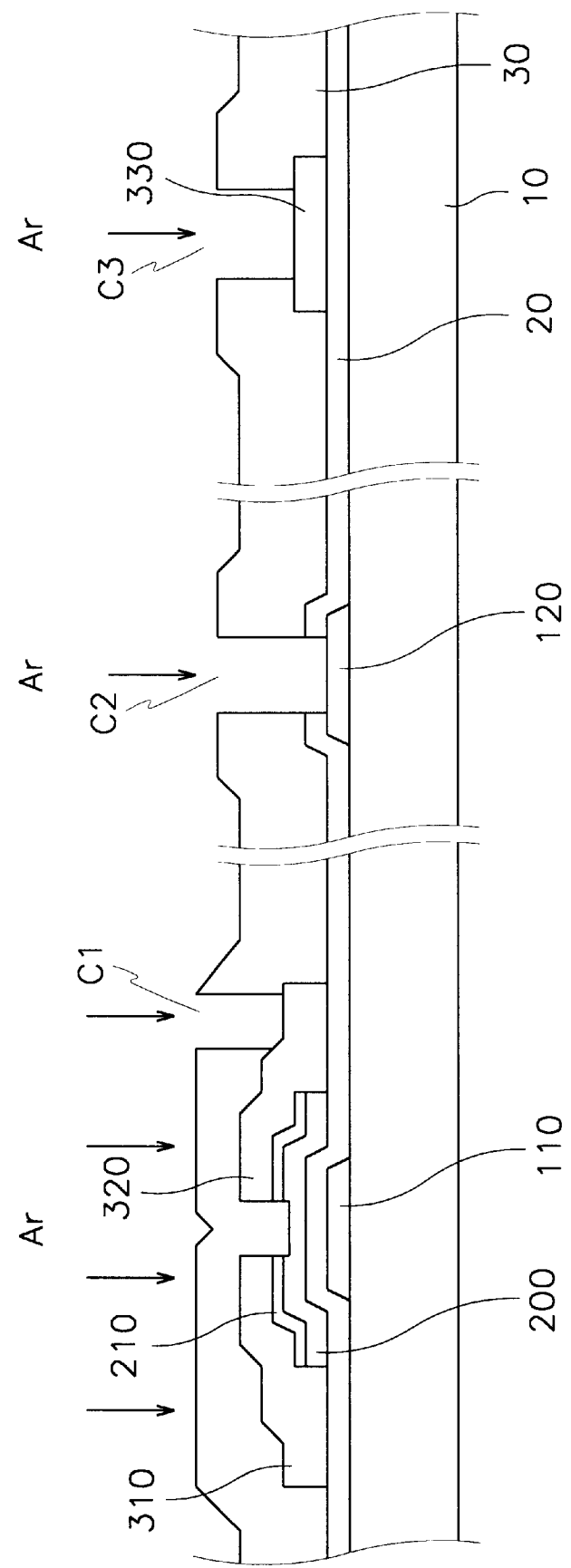

FIGS. 9 and 10 are a cross-sectional views showing a process of treating an organic insulating layer in the manufacturing process of an amorphous silicon thin film transistor array panel according to a second embodiment.

At first, by the same method as shown in FIGS. 1 to 4, a metal layer is deposited on an insulating substrate 10 and patterned to form a gate wire. The gate wire includes a plurality of gate lines 100 extending in a horizontal direction on FIGS. 1 and 3, a plurality of gate electrodes 110 connected to the gate line 100, and a plurality of gate pads 120 connected to each end of the gate lines 100 and receiving scanning signals. Next, a gate insulating layer 20, an amorphous silicon layer and a doped amorphous silicon layer are sequentially deposited on the gate wire 100,110, and 120. The doped amorphous silicon layer and the amorphous silicon layer are patterned at the same time to form a semiconductor layer 200 and an ohmic contact layer 210 of the gate electrode 110. Another metal layer is deposited on the semiconductor layer 200, the ohmic contact layer 210, and the gate insulating layer 20 and then patterned to form a data wire. The data wire includes a plurality of data lines 300 extending perpendicularly to the gate lines, a plurality of source electrodes 310 connected to the data line 300 and overlapping a side portion of the semiconductor layer 200, a plurality of drain electrodes 320 overlapping another side portion of the semiconductor layer 200 at the opposite side of the source electrode 310, and a plurality of data pads 330 connected to each end of the data lines 300. Next, the portion of the ohmic contact layer 210 not covered by the source electrode 310 and the drain electrode 320 is removed. A photosensitive organic insulating layer 30 is coated thereon. The organic insulating layer 30 is irradiated and developed to form contact holes C1, C2, and C3 respectively exposing the drain electrode 320, the gate insulating layer 20 on the gate pad 120, and the data pad 330. The exposed portion of the gate insulating layer 20 through the contact hole C2 is etched to expose the gate pad 120.

Next, as shown in FIG. 9, the organic insulating layer 30 is treated by oxygen ($O_2$) plasma for about 10 seconds. At this time, the residues in the contact holes C1, C2, and C3 are removed. Therefore, the contact resistance between the pixel electrode 410 and the drain electrode 320 is reduced.

Then, as shown in FIG. 10, the organic insulating layer 30 is treated by argon plasma for about 60 second. At this time, oxides partly induced by the previous oxygen plasma treatment and the still remaining residues are removed. Roughness of the organic insulating layer 30 is increased. Adhesion between the organic insulating layer 30 and the ITO layer formed afterward is improved because of the increased roughness.

Afterward, as described in the first embodiment, a pixel electrode 410, a redundant gate pad 420, and the redundant data pad 430 are formed.

As described above, the method according to the second embodiment of the present invention of treating the organic insulating layer 30 by oxygen plasma and argon plasma, reduces the contact resistance between the pixel electrode 410 and the drain electrode 320. The ITO patterns 410, 420, and 430 are prevented from being over-etched and undercut during the wet etch patterning. As a result, the width of the ITO patterns 410, 420, and 430 becomes increasingly uniform.

In the first and the second embodiments of the present invention, when chromium (Cr) is used as a data wire metal, an oxidation layer, such as a chromium oxide (CrOx) layer, having high resistance may be formed between the organic insulating layer 30 and the data wires 300, 310, 320, and 330.

Figure 11:
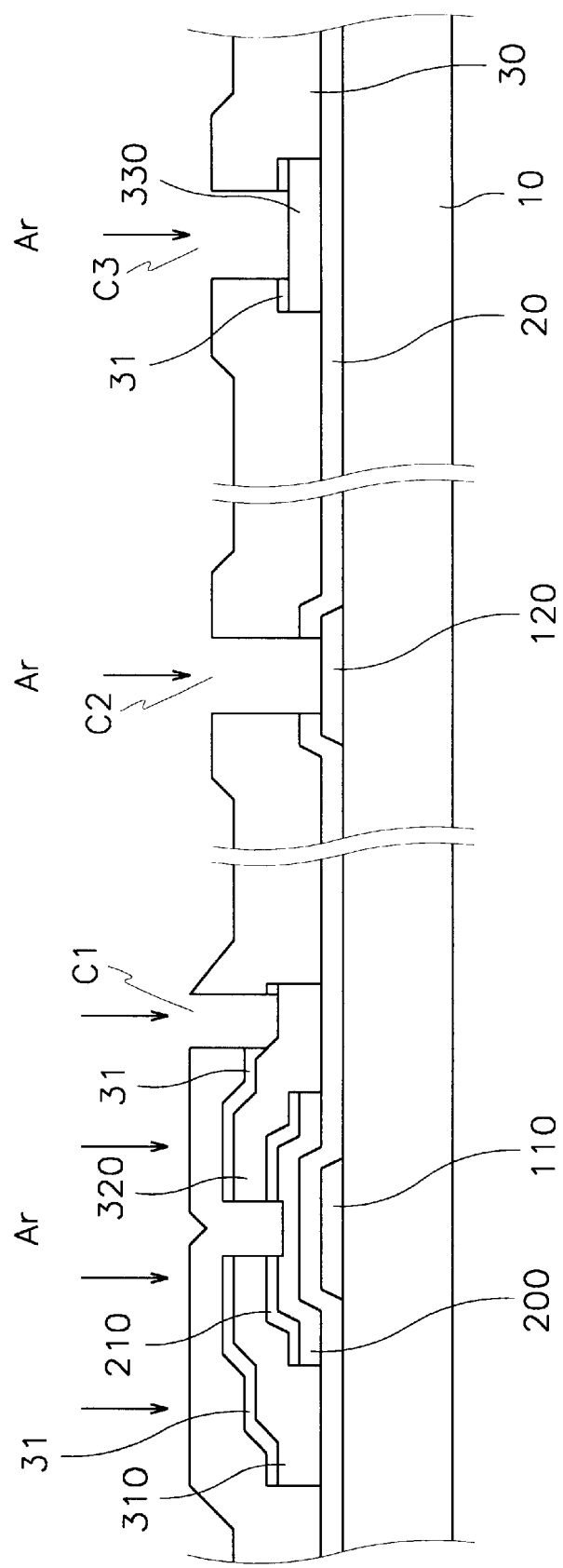
FIG. 11 is a cross-sectional view showing a process of forming a contact hole in the manufacturing process of an amorphous silicon thin film transistor array panel according to a third embodiment.

A method for removing the chromium oxide layer is shown in FIG. 11.

FIG. 11 is a cross-sectional view showing a process of forming contact holes in the manufacturing process of an amorphous silicon thin film transistor array panel according to a third embodiment.

A method according to the third embodiment is very similar to the first and the second embodiments. However, a process for partially removing the chromium oxide layer 31 is added after the process of forming the contact holes C1, C2, and C3.

As shown in FIG. 11, the chromium oxide layer 31, on the drain electrode 320 and the data pads 320 and 330 exposed though the contact holes C1 and C3, is removed by Ar sputtering.

Therefore, an increase of contact resistance between the drain electrode 320 and the pixel electrode 410 and between the data pad 330 and the redundant data pad 430 by the chromium oxide layer 31 is prevented.

In the above description, thin film transistor array panels using amorphous silicon as a semiconductor layer have been described. However, the present invention can be applied to a thin film transistor array panels using polysilicon as a semiconductor layer.

Figure 12:
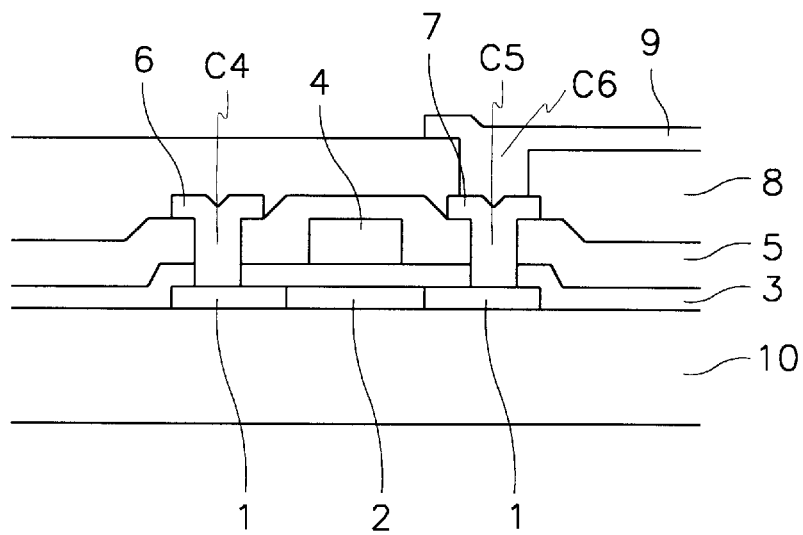
FIG. 12 is a cross-sectional view of an amorphous silicon thin film transistor array panel according to a fourth embodiment.

FIG. 12 is a cross-sectional view of an amorphous silicon thin film transistor array panel according to a fourth embodiment.

As shown in FIG. 12, a polysilicon pattern having a doped source and drain region 1 and an undoped channel region 2 is formed on a substrate 10. A gate insulating layer 3 is formed thereon. A gate electrode 4 is formed on the gate insulating layer 3. The gate electrode 4 is located at a location corresponding to the channel area 2. The gate electrode 4 and the gate insulating layer 3 are covered by an interlayer film 5. The interlayer film 5 and the gate insulating layer 3 have contact holes C4 and C5 respectively exposing the source region and drain region 1. A source electrode pattern 6 and a drain electrode pattern 7 respectively connected to the source region and the drain region 1 through the contact holes C4 and C5 are formed on the interlayer film 5. An organic insulating layer 8, which is a passivation layer and has a bypass hole C6 exposing the drain electrode pattern 7, is formed on the source electrode pattern 6 and the drain electrode pattern 7 and the interlayer film 5. An ITO pixel electrode 9 connected to the drain electrode 7 through the bypass hole C6 is formed on the organic insulating layer 8.

In the fourth embodiment of the present invention, like the former embodiments, a photosensitive organic insulating layer 8 having a good film flatness is used as a passivation layer. A good film flatness helps increase the aperture ratio. The treatment of the organic insulating layer 8 is also similar to that of the first and the second embodiments.

In other words, the organic insulating layer 8 is irradiated and developed to form a bypass hole C6 exposing the drain electrode pattern 7. Then, the organic insulating layer 8 is treated by argon plasma to remove the residues in the bypass hole C6 and to increase the surface roughness of the organic insulating layer 8. Furthermore, an oxygen plasma treatment may also be performed for a shorter period than the duration of the argon plasma treatment before the argon plasma treatment.

When the source electrodes 6 and the drain electrode 7 are formed of chromium, which induces a chromium oxide layer by reacting with the organic insulating layer 8, the surface of the drain electrode pattern 7 is treated by argon sputtering to remove chromium oxide layer.

As described above, in the method according to the fourth embodiment of the present invention, contact resistance between the pixel electrode 9 and the drain electrode 7 is reduced because the residues of the organic insulating layer 8 are removed from the bypass hole C6. The stronger adhesion between the organic insulating layer 8 and the transparent conducting layer prevents the transparent conducting layer from being over-etched and undercut during the wet etch patterning.

The methods of manufacturing thin film transistor array panels according to the first embodiment through the fourth embodiment may be applied to manufacturing a color filter array panel using an organic insulating layer as a passivation layer. Particularly, this method is essential in manufacturing a color filter array panel for a patterned vertically aligned (PVA) mode LCD that requires a transparent electrode to be patterned.

Figure 13:
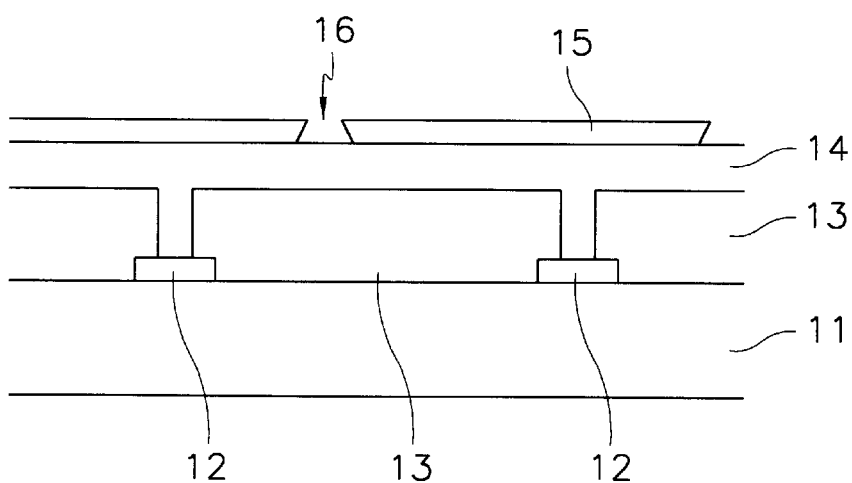
FIG. 13 is a cross-sectional view of a color filter array panel for a liquid crystal display.

FIG. 13 is a cross-sectional view of a color filter array panel for a PVA mode LCD using an organic insulating layer as a passivation layer, and showing the profile without an argon plasma treatment.

As illustrated in FIG. 13, red, green, and blue (R, G, and B) color filters 13 are alternately arranged on a substrate 11. A black matrix 12 is formed between the color filters 13. An organic insulating layer 14 is formed on the color filters 13 and the black matrix 12. A transparent electrode 15 of a transparent conducting layer such as ITO is formed on the organic insulating layer 14. The transparent electrode 15 has an aperture pattern 16 dividing a pixel into several regions.

If not treated by plasma, the organic insulating layer 14 does not adhere well to the transparent electrode 15. Hence, when the transparent conducting layer is wet etched to form the aperture pattern 16, the lower part of the transparent conducting layer is etched faster than the upper part. Therefore, as illustrated in FIG. 13, the transparent electrode 15 has an undercut and the lower part of the aperture pattern 16 is wider than the upper part. This undercut is one of main causes that hinder the width uniformity of the aperture pattern 16.

In a fifth embodiment, the same method of treating the organic insulating layer as in the former embodiment is used to strengthen the adhesion between the organic insulating layer 14 and the transparent electrode.

FIGS. 14A to 14D are cross-sectional views showing a process of manufacturing a color filter array panel according to a fifth embodiment.

Figure 14A:
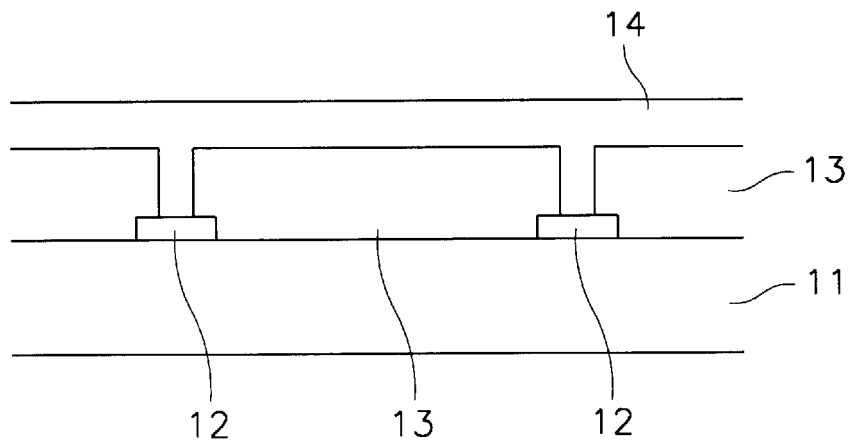
FIGS. 14A to 14D are cross-sectional views showing a process of manufacturing a color filter array panel according to a fifth embodiment.

At first, as shown in FIG. 14A, R, G and B color filters 13 are formed on a substrate, and an organic insulating layer is coated thereon.

Figure 14B:
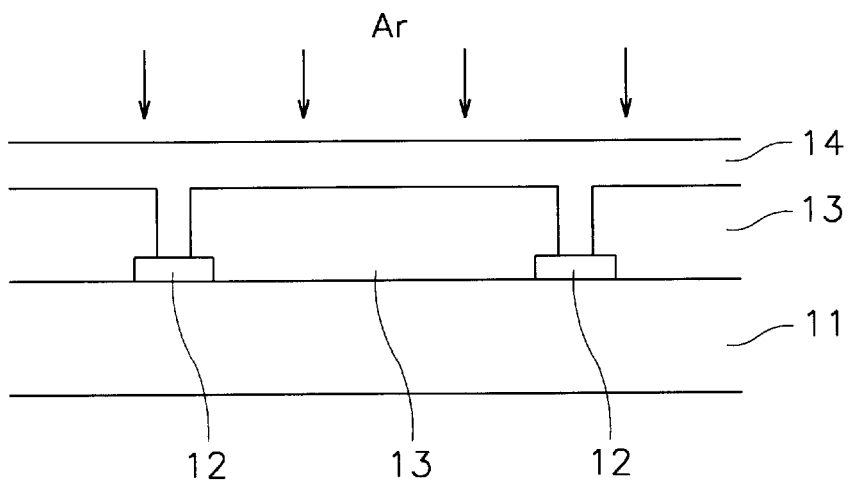

As shown in FIG. 14B, the organic insulating layer 14 is treated by argon plasma. This process increases the roughness of the organic insulating layer 14.

Figure 14C:
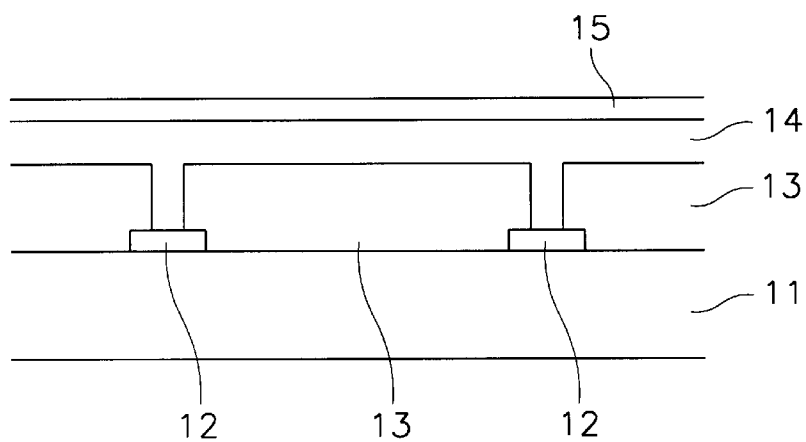

As shown in FIG. 14C, a transparent conducting layer such as ITO is deposited to form a transparent electrode 15.

Figure 14D:
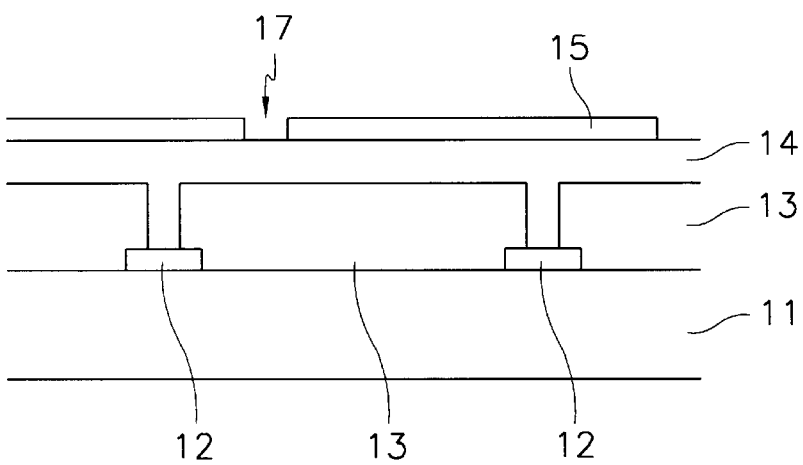

Next, as shown in FIG. 14D, an aperture pattern 17 is formed in the transparent electrode 15 by wet etching.

As described above, treating the organic insulating layer 14 by argon plasma increases the surface roughness of the organic insulating layer 14. Increased surface roughness enhances the adhesion between the organic insulating layer 14 and the transparent electrode 15, which increases the uniformity of the aperture pattern.

Next, a sixth and seventh embodiment having a color filter structure on a thin film transistor (TFT) array panel will be described.

First, the structure and the manufacturing method of a panel for an LCD according to the sixth embodiment will be described with reference to FIG. 15.

Figure 15:
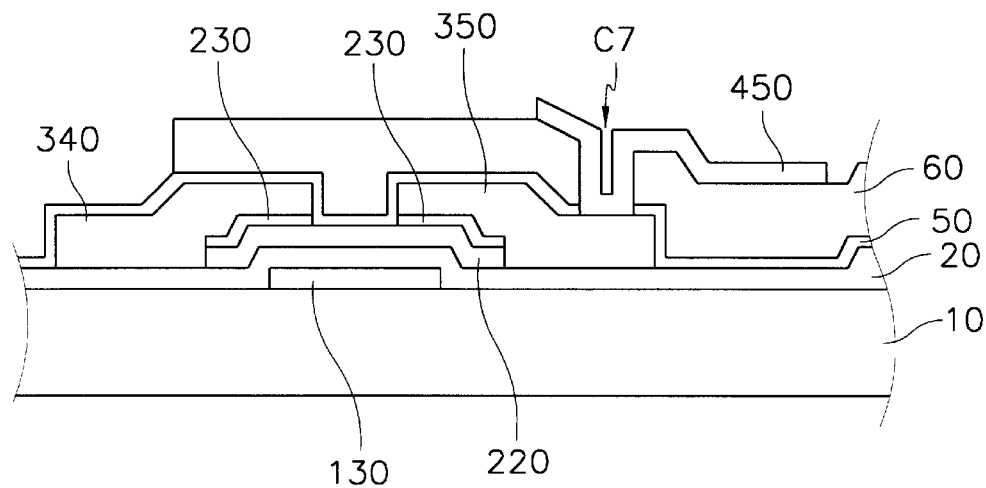
FIG. 15 is a cross-sectional view of a panel for a liquid crystal display according to a sixth embodiment.

As shown in FIG. 15, a gate wire including a plurality of gate lines (not illustrated) and gate electrodes 130, etc. are formed on a substrate 10. A gate insulating layer 20 is then formed thereon.

A semiconductor layer 220 of amorphous silicon is formed on the gate insulating layer and above the gate electrode 130. An ohmic contact layer 230 of doped amorphous silicon is formed on the semiconductor layer 220. This ohmic contact layer 230 is separated into two portions. A data wire including a plurality of data lines (not illustrated) and source and drain electrodes 340 and 350 contacting with the ohmic contact layer 230, etc. are formed on the gate insulating layer 20. At this point, the data line may be about 20 μm wide, which is much wider than the conventional device that is 6 μm to 7 μm. This is possible because color filters 60 are formed on the thin film transistor array panel.

A thin passivation layer 50 of silicon nitride (SiNx) is formed on the gate wire and the gate insulating layer 20. This passivation layer 50 prevents the channel semiconductor area of the TFT from contacting the color filters 60, which will be formed later.

The R, G, and B color filters 60 are alternately formed on the passivation layer 50. The color filters 60 and the passivation layer 50 have a contact hole C7 exposing the drain electrode 350.

A pixel electrode 450 of a transparent conducting material such as ITO is formed on each of the color filters 60. The pixel electrode 450 is connected to the drain electrode 350 through the contact hole C7.

A method for manufacturing the panel for an LCD having the above structure will now be described.

A metal layer is deposited on the substrate 10 by a method such as sputtering and patterned by photolithography to form the gate wire. A gate insulating layer of silicon nitride is deposited on the whole metal layer. Next, an amorphous silicon layer and an amorphous silicon layer doped with phosphorus (P) are sequentially deposited. The amorphous silicon layer and the doped amorphous silicon layer are patterned at once to form the semiconductor layer 220 and the ohmic contact layer 230 on the gate insulating layer 20 and above the gate electrode 130.

Next, a conducting layer of an inert metal such as chromium and molybdenum is deposited and patterned to form a data wire including a data line (not illustrated) and a source electrode and a drain electrode. The exposed portion of the ohmic contact layer 230 between the source electrode 340 and the drain electrode 350 is removed by etching.

Next, a thin silicon nitride layer is deposited on the data wire 340 and 350, the semiconductor layer 220, and the gate insulating layer 20 to form the passivation layer 50.

A photosensitive material containing a color source is repeatedly coated on the passivation layer 50 and developed to form the R, G, and B color filters 60.

The color filters 60 and the passivation layer 50 are patterned to form the contact hole C7. At this time, residues of the color filter 60 material may remain in the contact hole C7 because the color filter 60 material is softer than the silicon nitride. To remove this residue and to increase the surface roughness of the color filter 60, either the argon plasma treatment or the sequential treatment of oxygen plasma and argon plasma is applied.

Next, a transparent conducting layer of ITO is deposited and patterned to form the pixel electrode 450 connected to the drain electrode 350 through the contact hole C7.

As described above, the method according to the sixth embodiment of the present invention that treats the color filters 60 with argon plasma or with oxygen plasma and argon plasma in sequence, reduces the contact resistance between the pixel electrode 450 and the drain electrode 350. Furthermore, the adhesion between the pixel electrode 450 and the color filters 90 is strengthened.

Figure 16:
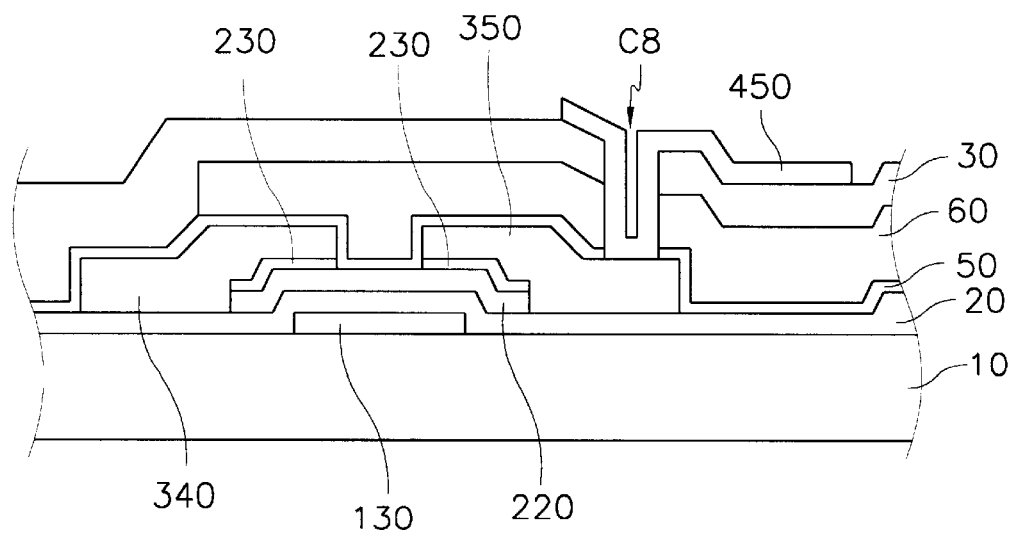
FIG. 16 is a cross-sectional view of a panel for a liquid crystal display according to a seventh embodiment.

FIG. 16 is a cross-sectional view of a panel for an LCD according to a seventh embodiment of the present invention. FIG. 16 shows a panel structure similar to the sixth embodiment. However, an organic insulating layer 30 is formed between the color filter 60 and the pixel electrode 450. A contact hole C8 is formed through the organic insulating layer 30, the color filters 60, and the passivation layer 50.

The manufacturing method of above described panel is almost the same as the sixth embodiment. However, the organic insulating layer 30 is formed by a method such as spin coating on the color filters 60 after their formation. The organic insulating layer 30 is patterned along with the color filters 60 and the passivation layer 50 to form the contact hole C8. Then, the argon plasma treatment or the sequential treatment of the oxygen plasma and argon plasma is applied to remove residues of the organic insulating layer 30 and the color filters 60, and to increase the surface roughness of the organic insulating layer 30.

Therefore, contact resistance between the ITO pixel electrode 450 and the drain electrode 350 is reduced and the adhesion between the pixel electrode 450 and the organic insulating layer 30 is strengthened.

Detailed data concerning contact resistance and the treatment conditions of ITO layers such as those of a pixel electrode for various plasma treatments are presented in TABLE 1.

TABLE 1

| | Condition for treating the organic insulating layer | Contact resistance* | | | | Average resistance | ITO layer pattern |
|---|---|---|---|---|---|---|---|
| | | R1 | R2 | R3 | R4 | | |
| Condition No. 1 | First: $O_2$ substrate plasma treatment (300 sccm), Second: Ar plasma treatment (50 sccm) | 23.7 | 26.7 | 16.1 | 21.0 | 21.9 | Good |
| Condition No. 2 | Ar plasma treatment (50 sccm) | 17.7 | 22.0 | 13.7 | 16.5 | 17.5 | Good |
| Condition No. 3 | Ar and $O_2$ substrate mixed plasma treatment (50 sccm, 30 sccm respectively) | 9800 | 260 | 72.6 | 97.6 | 2557.6 | Under cut |
| Condition No. 4 | No plasma treatment | X | X | X | X | Very high value | Under cut |

*Units: kΩ per 200 contact holes

The above four conditions of plasma treatment are as follows.

Condition No. 1: The organic insulating layer is treated by an oxygen plasma of 300 sccm flux as a first process about 10 seconds, and then treated by an argon plasma of 50 sccm flux as a second process about 60 seconds.

Condition No. 2: The organic insulating layer is treated by an argon plasma of 50 sccm flux for about 60 seconds.

Condition No. 3: The organic insulating layer is treated by a plasma using a mixed gas of argon and oxygen for about 60 seconds. At this time, the flux of the argon is 50 sccm and the flux of the oxygen is 30 sccm.

Condition No. 4: The organic insulating layer is not plasma-treated.

As shown in TABLE 1, the contact resistances of condition Nos. 1, 2, and 3 are lower than that of condition No. 4. However, condition No. 3 using mixed gas of argon and oxygen renders a higher contact resistance than condition Nos. 1 and 2, as well as a non-uniform contact resistance. Therefore, condition Nos. 1 and 2 are deemed suitable for a contact resistance.

Regarding the ITO layer pattern, condition Nos. 3 and 4 induce undercutting and over-etching, while condition Nos. 1 and 2 render a good pattern without undercutting and over-etching.

Whether undercutting and over-etching occur or not depends upon the surface roughness of the organic insulating layer. The rougher surface of the organic insulating layer renders, the better patterning properties of ITO.

This can be shown with reference to TABLE 2.

TABLE 2 shows the surface roughness depending on the conditions of organic insulating layer treatment.

TABLE 2

| | Measuring point | Measured area ($\mu m^2$) | Average height (Å) | RMS surface roughness (Å) | Average surface roughness (Å) |
|---|---|---|---|---|---|
| Condition No. 1 | 1 | 100 | 50 | 14 | 12 |
| | 2 | | 50 | 15 | 12 |
| | 3 | | 53 | 14 | 11 |
| Condition No. 2 | 1 | 100 | 55 | 14 | 12 |
| | 2 | | 58 | 16 | 12 |
| | 3 | | 58 | 16 | 12 |
| Condition No. 3 | 1 | 100 | 34 | 7.3 | 5.7 |
| | 2 | | 31 | 6.6 | 5.3 |
| | 3 | | 26 | 6.7 | 5.3 |
| Condition No. 4 | 1 | 100 | 14 | 3.6 | 2.9 |
| | 2 | | 14 | 3.5 | 2.8 |
| | 3 | | 14 | 3.5 | 2.8 |

The surface roughness was measured by an atomic force microscope (AFM). The organic insulating layers, which are the test samples, were respectively treated in the conditions described in TABLE 1. Three points in the pixel area of each sample were randomly elected as measuring points. A 10 $\mu m \times 10$ $\mu m$ area around each point was used for the measurement of roughness.

As shown in TABLE 2, the conditions No. 1, 2, and 3, which were treated by plasma, have high values of the root means square (RMS) and average surface roughness that are about double to quadruple of the surface roughness values associated with condition 4, which was not plasma-treated. Condition 1, in which the organic insulating layer was treated with oxygen plasma and argon plasma in a sequence, shows a surface roughness similar to that of condition No. 2 that was treated only with argon plasma. Condition No. 3, which was treated with plasma of the mixed gas of oxygen and argon shows a lower roughness than the condition Nos. 1 and 2.

As shown by TABLEs 1 and 2, condition Nos. 1 and 2 render organic insulating layers rougher than the other conditions and provide at the same time better ITO patterns. This is because the increased surface roughness enhances the adhesion between the ITO layer and the organic insulating layer, preventing an over-etching and an undercutting.

TABLE 3 and FIG. 9 show how the plasma treatment of the organic insulating layer affect the LCD properties.

TABLE 3

| | L | Y | Transparency Ratio | |
|---|---|---|---|---|
| Condition No. 1 | 98.003 | 96.046 | 98.725(1.25%↓) | After treating the organic insulating layer |
| Condition No. 2 | 97.459 | 94.982 | 98.177(1.83%↓) | |
| Condition No. 3 | 99.268 | 98.541 | 99.986(0.014%↓) | |
| Condition No. 4 | 99.281 | 98.567 | 100 | |
| Condition No. 1 | 93.023 | 86.534 | 97.965(2.035%↓) | After forming the ITO layer |
| Condition No. 2 | 92.743 | 86.534 | 97.965(2.035%↓) | |
| Condition No. 3 | 94.146 | 88.635 | 99.148(0.852%↓) | |
| Condition No. 4 | 94.955 | 90.164 | 100 | |

The transparency ratios of the plasma-treated organic insulating layers and the transparency ratios of the plasma-treated organic insulating layers with an ITO layer formed thereon are measured. The treatment condition Nos. 1 to 4 are the same as those of TABLE 1. The transparency ratios for different wavelengths were measured. At this time, the transparency ratio of condition Nos. 4 is assumed to be 100, and the transparency ratios of the other conditions are calculated as relative values of the transparency ratio of the condition No. 4. L represents the average transparency ratio for all visible light. Y represents the transparency ratio for light of the wavelengths from 540 to 550 nm.

As shown in TABLE 3, the transparency ratios after plasma treatments decrease in the following order: condition No. 4 (100)>condition No. 3 (99.986)>condition No.1 (98.725)>condition No. 2 (98.177). The transparency ratio after the forming of the ITO layer is decreased by a small amount. However, the above order is not changed: condition No.4 (100)>condition No. 3 (99.148)>condition No. 1 (97.965)>condition No. 2 (97.670).

As described above, the plasma treatments according to the conditions No. 1 and 2 enhance the property of contact resistance and adhesiveness, but decrease transparency ratio a little. Nevertheless, the decrement of transparency ratio ranges from about 1.25% to 1.82% (and after forming the ITO layer from 2.035% to 2.33%). Hence, it does not affect very much the overall transparency ratio of an LCD.

However, the variation of the transparency ratio among the different treatment conditions diminish as the wavelength of the light becomes longer.

Figure 17:
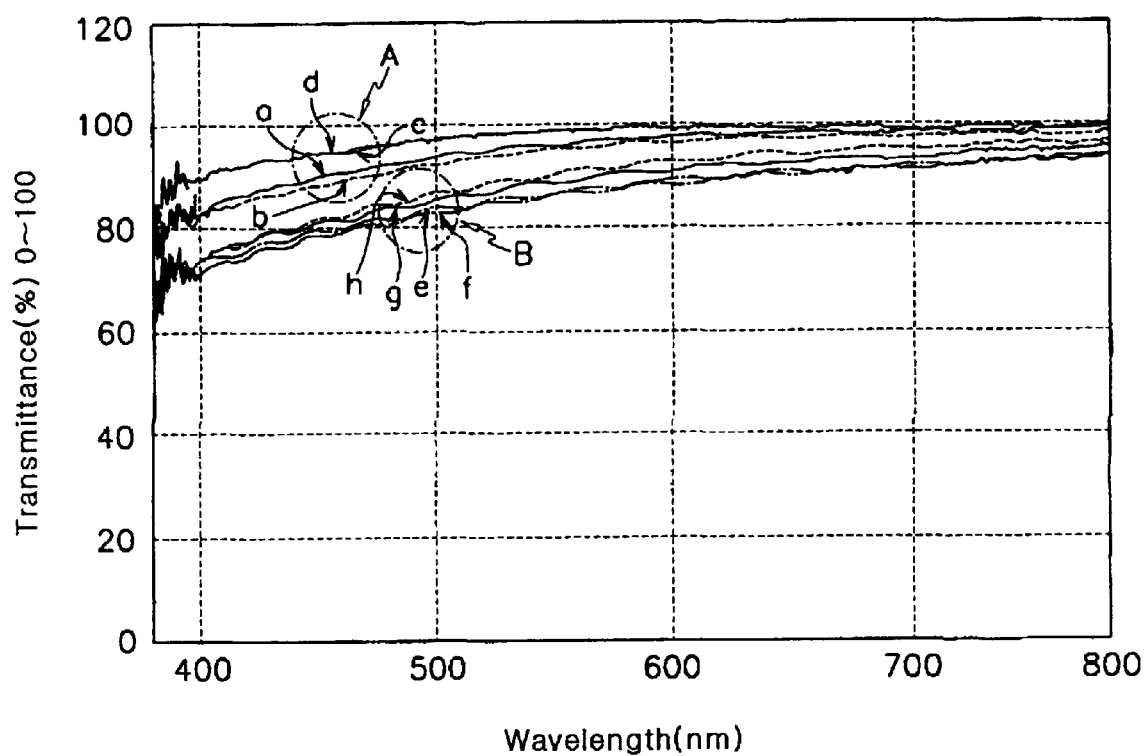
FIG. 17 is a graph showing the variance of transmittance according to the wavelength of light under different conditions for treating an organic insulating layer.

FIG. 17 shows the variance of transparency ratio with respect to the wavelength of visible light. The a, b, c, and d lines of group A on FIG. 17 represent transparency ratios after treating the organic insulating layer under conditions Nos. 1 to 4, respectively. The e, f, g, and h lines of group B respectively represent these transparency ratios after forming the ITO layer.

As shown in FIG. 17, the order of the transparency ratios is d>c>a>b and h>g>e>f in the region of the visible light. However, the variation of transparency ratios among the conditions decreases as the wavelength of the light becomes longer. As described above with reference to TABLE 3, the decrease of the transparency ratio is from 1.25% to 1.82% in the visible light spectrum.

In other words, LCD display properties, such as transparency ratio, do not decrease much because of the plasma treatment.

As described above, the method according to the present invention of treating an organic insulating layer by oxygen plasma and argon plasma, reduces the contact resistance between a pixel electrode and a drain electrode. A transparent electrode pattern is also prevented from being overetched and undercut during wet etch patterning. As a result, the width of the transparent electrode pattern becomes increasingly uniform.

In the drawings and specification, there have been disclosed typical preferred embodiments of the present invention and, although specific terms are employed, they are used in a generic and descriptive sense only and not for purposes of limitation, the scope of the invention being set forth in the following claims.

What is claimed is:

1. A method for manufacturing a liquid crystal display panel, comprising the steps of:

forming an organic insulating layer on an insulating substrate;

treating the organic insulating layer with a first plasma;

depositing a transparent conducting layer on the organic insulating layer treated with the first plasma; and patterning the transparent conducting layer, wherein the organic insulating layer is treated with a second plasma before treating with the first plasma.

2. The method of claim 1, wherein the first plasma treatment is performed by using argon gas.

3. The method of claim 1, wherein the second plasma treatment is performed by using oxygen gas.

4. The method of claim 1, further comprising the step of forming a polysilicon layer including a doped source and drain region and an undoped channel region.

5. The method of claim 1, further comprising the steps of:

forming color filter patterns and a black matrix layer on the insulating substrate; and patterning the transparent conducting layer to form an aperture pattern in the transparent conducting layer.

6. The method of claim 1, further comprising the steps of:

forming a gate wire including a plurality of gate lines and gate electrodes on the insulating substrate;

forming a semiconductor layer overlapping and insulated from the gate electrodes;

depositing a metal layer for a data wire on the gate wire, the semiconductor layer, and the insulating substrate, patterning the metal layer to form the data wire including a plurality of data lines crossing and insulated from the gate lines, source electrodes connected to the data lines and overlapping a boundary of the semiconductor layer, and drain electrodes overlapping a boundary of the semiconductor layer at an opposite side from the source electrodes;

forming a plurality of first contact holes exposing the drain electrodes by removing portions of the organic insulating layer; and patterning the transparent conducting layer to form a plurality of pixel electrodes connected to the drain electrodes through the first contact holes, located in a pixel area defined by the gate lines and the data lines, and overlapping the gate lines and the data lines.

7. The method of claim 6, wherein the metal layer for the data wire is formed of chromium.

8. The method of claim 6, wherein the semiconductor layer is amorphous silicon.

9. The method of claim 6, further comprising the step of sputtering the surface of the drain electrodes exposed through the first contact holes after forming the first contact holes.

10. The method of claim 9, wherein the step of sputtering uses argon gas.

11. The method of claim 9, further comprising the steps of:
   patterning the metal layer for the data wire to form a plurality of data pads connected to each end of the data lines; and
   patterning the organic insulating layer to form second contact holes exposing the data pads,
   wherein the data pads exposed through the second contact holes are also sputtered in the step of sputtering the surface of the drain electrodes.

12. The method of claim 11, further comprising the step of patterning the transparent conducting layer to form a plurality of redundant data pads connected to the data pads through the second contact holes.

13. The method of claim 1, further comprising the steps of:
   forming a gate wire including a plurality of gate lines and gate electrodes on the insulating substrate;
   forming a semiconductor layer overlapping and insulated from the gate electrodes;
   depositing a metal layer for a data wire on the gate wire, the semiconductor layer, and the insulating substrate;
   patterning the metal layer to form the data wire including a plurality of data lines crossing and insulated from the gate lines, source electrodes connected to the data lines and overlapping a boundary of the semiconductor layer and drain electrodes overlapping a boundary of the semiconductor layer at an opposite side from the source electrodes;
   forming a plurality of first contact holes exposing the drain electrodes by removing portions of the organic insulating layer; and
   patterning the transparent conducting layer to form a plurality of pixel electrodes connected to the drain electrodes through the first contact holes, located in a pixel area defined by crossing of the gate lines and the data lines, and overlapping the gate lines and the data lines.

14. The method of claim 13, wherein the metal layer for the data wire is formed of chromium.

15. The method of claim 13, wherein the semiconductor layer is amorphous silicon.

16. The method of claim 13, further comprising the step of sputtering the surface of the drain electrodes exposed through the first contact holes after forming the first contact holes.

17. The method of claim 16, wherein the step of sputtering uses argon gas.

18. The method of claim 16, further comprising the steps of:
   patterning the metal layer for the data wire to form a plurality of data pads connected to each end of the data lines; and
   patterning the organic insulating layer to form second contact holes exposing the data pads,
   wherein the data pads exposed through the second contact holes are also sputtered in the step of sputtering the drain electrodes.

19. The method of claim 18, further comprising the step of patterning the transparent conducting layer to form a plurality of redundant data pads connected to the data pads through the second contact holes.

20. A method for manufacturing a liquid crystal display panel, comprising the steps of:
   forming a gate wire including a plurality of gate lines and gate electrodes on an insulating substrate;
   sequentially depositing a first insulating layer, a semiconductor layer, and an ohmic contact layer on the gate wire;
   patterning the ohmic contact layer and the semiconductor layer to form an ohmic contact layer pattern and a semiconductor layer pattern;
   forming a data wire including a plurality of data lines and source electrodes and drain electrodes contacting the ohmic contact layer pattern;
   forming color filters on the data wire, the gate wire, and the first insulating layer;
   patterning the color filters to form a plurality of first contact holes exposing the drain electrodes;
   treating the color filters with a first plasma;
   depositing a transparent conducting layer on the treated color filters; and
   patterning the transparent conducting layer to form a plurality of pixel electrodes connected to the drain electrodes through the first contact holes.

21. The method of claim 20, wherein the first plasma treatment is performed by using argon gas.

22. The method of claim 20, further comprising the step of forming a passivation layer covering the semiconductor layer before forming the color filters.

23. The method of claim 20, further comprising the step of treating the color filters with a second plasma before the first plasma treatment.

24. The method of claim 23, wherein the second plasma treatment is performed by using oxygen gas.

25. A method for manufacturing a panel for a liquid crystal display, comprising the steps of:
   forming a gate wire including a plurality of gate lines and gate electrodes on an insulating substrate;
   sequentially depositing a first insulating layer, a semiconductor layer, and an ohmic contact layer on the gate wire;
   patterning the ohmic contact layer and the semiconductor layer to form an ohmic contact layer pattern and a semiconductor layer pattern;
   forming a data wire including a plurality of data lines and source electrodes and drain electrodes contacting the ohmic contact layer pattern;
   forming color filters on the data wire, the gate wire, and the first insulating layer;
   forming an organic insulating layer covering the color filters;
   patterning the organic insulating layer and the color filters to form a plurality of first contact holes exposing the drain electrodes;
   treating the organic insulating layer with a first plasma;
   depositing a transparent conducting layer on the treated organic insulating layer; and
   patterning the transparent conducting layer to form a plurality of pixel electrodes connected to the drain electrodes through the first contact holes.

26. The method of claim 25, wherein the first plasma treatment is performed by using argon gas.

27. The method of claim 25, further comprising the step of forming a passivation layer covering the semiconductor layer before forming the color filters.

28. The method of claim 25, further comprising the step of treating the organic insulating layer with a second plasma before the first plasma treatment.

29. The method of claim 28, wherein the second plasma treatment is performed by using oxygen gas.

* * * * *